United States Patent
Pignard (10) Patent No.: US 12,539,686 B2
(45) Date of Patent: Feb. 3, 2026

(54) INTERIOR TRIM COMPONENT WITH A THREE-DIMENSIONAL SHAPE FOR A MOTOR VEHICLE AND DEVICE AND METHOD FOR PRODUCING SUCH AN INTERIOR TRIM COMPONENT

(71) Applicant: MOTHERSON INNOVATIONS COMPANY LIMITED, London (GB)

(72) Inventor: Pierre Pignard, Jebsheim (FR)

(73) Assignee: Motherson Innovations Company Limited, London (GB)

( * ) Notice: Subject to any disclaimer, the term of this patent is extended or adjusted under 35 U.S.C. 154(b) by 649 days.

(21) Appl. No.: 16/996,337

(22) Filed: Aug. 18, 2020

(65) Prior Publication Data

US 2021/0070010 A1    Mar. 11, 2021

(30) Foreign Application Priority Data

Sep. 5, 2019    (EP) .................................... 19195632

(51) Int. Cl.
*B32B 5/02* (2006.01)
*B29C 43/18* (2006.01)
(Continued)

(52) U.S. Cl.
CPC ............ *B32B 5/022* (2013.01); *B29C 43/183* (2013.01); *B29C 43/203* (2013.01);
(Continued)

(58) Field of Classification Search
CPC .. B32B 5/00; B32B 5/02; B32B 5/022; B32B 5/06; B32B 5/10; B32B 5/14;
(Continued)

(56) References Cited

U.S. PATENT DOCUMENTS 4,035,215 A    7/1977    Goldstone
4,568,581 A *  2/1986    Peoples, Jr. .......... D04H 1/5418
                                                          442/403
(Continued)

FOREIGN PATENT DOCUMENTS

CH    698 249 B1    6/2009
EP    2 926 966 A1  10/2015
(Continued)

OTHER PUBLICATIONS

European Search Report issued on Mar. 24, 2020 with respect to counterpart European patent application 19 19 5632.5.
(Continued)

*Primary Examiner* — Christopher W Raimund
(74) *Attorney, Agent, or Firm* — Ursula B. Day, Esq.

(57) ABSTRACT

The present invention relates to an interior trim component with a three-dimensional shape, wherein the interior trim component is produced from a single nonwoven material and includes a first surface and a second surface. At least one region that forms the first surface, and at least one first section and at least one second section, each of which forming a part of the second surface, wherein the first section has a first section hardness, H1 and the second section has a second section hardness, H2, and the first section hardness H1 and the second section hardness H2 are different.

10 Claims, 6 Drawing Sheets

(51) Int. Cl.
  *B29C 43/20* (2006.01)
  *B29C 43/36* (2006.01)
  *B32B 5/06* (2006.01)
  *B32B 5/14* (2006.01)
  *B32B 7/022* (2019.01)
  *B32B 7/09* (2019.01)

(52) U.S. Cl.
  CPC .............. *B29C 43/361* (2013.01); *B32B 5/06* (2013.01); *B32B 5/145* (2013.01); *B32B 7/022* (2019.01); *B32B 7/09* (2019.01); *B29C 2043/3615* (2013.01); *B32B 2262/0284* (2013.01); *B32B 2307/304* (2013.01); *B32B 2307/536* (2013.01); *B32B 2307/722* (2013.01); *B32B 2309/105* (2013.01); *B32B 2367/00* (2013.01); *B32B 2605/003* (2013.01)

(58) Field of Classification Search
  CPC .. B32B 5/145; B32B 7/00; B32B 7/02; B32B 7/022; B32B 7/09; B32B 2262/0284; B32B 2307/304; B32B 2307/536; B32B 2307/722; B32B 2309/105; B32B 2367/00; B32B 2605/003; B29C 43/00; B29C 43/10; B29C 43/18; B29C 43/183; B29C 43/20; B29C 43/203; B29C 43/30; B29C 43/36; B29C 43/361; B29C 2043/3615; B29C 43/14; B29C 2043/141; B29C 43/52; B29C 43/021; B29C 2043/022; B29C 2043/522; B29C 2043/525; B60R 13/0243; B60R 13/02; D04H 1/435; D04H 1/4382; D04H 1/46; D06C 7/02
  See application file for complete search history.

(56) References Cited

U.S. PATENT DOCUMENTS

| | | |
|---|---|---|
| 2003/0124940 A1 | 7/2003 | Michael |
| 2003/0162461 A1* | 8/2003 | Balthes ................. D04H 1/425 442/411 |
| 2003/0224145 A1 | 12/2003 | Campion et al. |
| 2003/0227107 A1 | 12/2003 | Stewart |
| 2006/0105661 A1* | 5/2006 | Steinbach ............... B29C 43/22 442/381 |
| 2010/0032870 A1 | 2/2010 | Pfeiffer et al. |
| 2010/0219561 A1 | 9/2010 | Pfaffelhuber |
| 2013/0052412 A1 | 2/2013 | Fox et al. |
| 2013/0069266 A1* | 3/2013 | Dua ........................ B32B 5/06 264/36.11 |
| 2015/0115643 A1 | 4/2015 | Stepanski |
| 2017/0080617 A1 | 3/2017 | Gassman et al. |
| 2017/0182729 A1 | 6/2017 | Fox et al. |
| 2018/0079372 A1* | 3/2018 | Iwasaki .................. B29C 43/02 |

FOREIGN PATENT DOCUMENTS

FR      2 924 972 A1    6/2009
WO  WO 2015/022086 A1  2/2015
WO  WO 2017/053313 A1  3/2017

OTHER PUBLICATIONS

Translation of European Search Report issued on Mar. 24, 2020 with respect to counterpart European patent application 19 19 5632.5.

* cited by examiner

INTERIOR TRIM COMPONENT WITH A THREE-DIMENSIONAL SHAPE FOR A MOTOR VEHICLE AND DEVICE AND METHOD FOR PRODUCING SUCH AN INTERIOR TRIM COMPONENT

CROSS-REFERENCES TO RELATED APPLICATIONS

This application claims the priority of European Patent Application Serial No. 19 195632.5, filed Sep. 5, 2019, pursuant to 35 U.S.C. 119(a)-(d), the subject matter of which is incorporated herein by reference.

BACKGROUND OF THE INVENTION

The present invention relates to an interior trim component having a three-dimensional shape for use in a motor vehicle. The invention also relates to a device and a method for producing such an interior trim component.

In addition to the pure function of motor vehicles, their design is becoming increasingly important when making a purchase decision. The design of a motor vehicle not only extends to the external appearance, but the design of the interior also plays an increasingly important role. Interior trim components play a central role in the design of the interior. In addition to the main task of giving the interior an attractive appearance, the haptic impression experienced by a vehicle occupant when touching the interior trim component is becoming increasingly important. Interior trim components attached to the vehicle doors are also referred to as door side panels and often provide a support surface for the arm in the vicinity of the door pull handle, on which the vehicle occupant can rest his forearm. It is desirable here to make the arm support surface relatively soft and coarse in order to provide a certain amount of padding, so that the vehicle occupant can rest his forearm as comfortably as possible, particularly from a haptic point of view. In other sections of the interior trim component, however, it may be desirable to make it rather hard and smooth, for example to provide technical surfaces with clearly defined properties. For example, it may be necessary to provide the technical surfaces with sufficient hardness and/or stability so that these surfaces can be used for connecting the trim component to adjacent components. The respective trim component can, for example, be welded or screwed to the adjacent component. The technical surfaces are specifically designed for this type of connection.

SUMMARY OF THE INVENTION

One aspect of an embodiment of the present invention is to propose an interior trim component which has sections with different surface properties and which nevertheless can be easily manufactured. In addition, it is the object of an embodiment and a design of the invention to create a device or a method for producing such an interior trim component.

This aspect and others is achieved with the features of the present invention that relates to an interior trim component with a three-dimensional shape for a motor vehicle, wherein the interior trim component is produced from a single nonwoven material and includes:
a first surface and a second surface,
at least one first portion and at least one second portion, each of which form a part of the second surface, wherein the first portion has a first section hardness and the second section has a second section hardness, and the first section hardness and the second section hardness are different.

The proposed interior trim component is characterized in that it is, on the one hand, composed of a single nonwoven material and that it has, on the other hand, sections with different surface properties. These sections each form a part of the second surface, which is the surface that forms the visible side of the interior trim component and that is therefore perceptible from the inside of the motor vehicle. In this case, the different surface properties are characterized in that the respective sections have different hardness. The section which is constructed to be softer than the other section can serve, for example, as an arm support surface. With the proposed interior trim component, it is therefore not necessary to produce a separate component for the arm support surface and to later connect the separate component to the rest of the interior trim component, which is the reason why manufacture and assembly of the proposed interior trim component are significantly simplified and accelerated compared to conventional interior trim components. It will be understood that the interior trim component can also have more than two sections with different surface properties.

The relevant hardness of the sections can be more concisely defined as follows: when a steel ball with a diameter of 30 mm is pressed onto the portions to be tested with a pressing force of 50 N (with 0.2 N preload) and a speed of 100 mm/min, the following impression depths are obtained:

| Characterization | Depth of impression |
|---|---|
| Hard or hard/fluffy | 0.2 to 0.6 mm |
| Soft or soft/fluffy | 1.3 to 5 mm or more |
| Intermediate region: | 0.6 to 1.3 mm |

An interior trim component with a three-dimensional shape is to be understood as an interior trim component with curved sections and/or flat sections, with the flat sections having different wall thicknesses. The curved sections can also have different wall thicknesses.

According to another embodiment, the interior trim component has at least one region which forms the first surface, with the first section hardness being greater than the second section hardness and the region having a region hardness which is equal to the first section hardness.

The region with the region hardness forms the first surface, i.e. the surface facing the visible side. According to this embodiment, this region is designed with the same hardness as the higher or highest section hardness on the visible side, but may also have a different hardness. The interior trim component is therefore provided with the higher or highest hardness on the side facing the visible side. The higher or highest hardness on the side facing visible side gives the interior trim component a kind of support function. As a result, the interior trim component is protected from deformation, so that the installation in the motor vehicle is not made difficult or even impossible by undesired deformations which can occur, for example, during transport or during storage of the interior trim component. In addition, because the higher or the highest hardness is on the side facing the visible side, technical functions can be implemented, in particular for attaching the interior trim component.

In another embodiment, the interior trim component may have a first density in the first section and a second density in the second section, wherein the first density of between 0.6 g/cm$^3$ and 1 g/cm$^3$ and the second density is between 0.1 g/cm³ and 0.6 g/cm³. The different hardness values can be set in a comparatively simple manner by using the different densities. It has been found that the desired hardness values can be achieved by using the densities in the specified ranges.

In another embodiment, the first section may have a first surface roughness and the second section may have a second surface roughness, wherein the first surface roughness may be different from the second surface roughness. The surface roughness is an important measure for the haptic sensation. In the context of the present description, the surface roughness should, unlike the ordinary meaning of the term, serve as a measure for how smooth or how fluffy the vehicle occupant perceives the surface of the respective section from a haptic perception. With a smooth surface, no nonwoven fibers or only very few protruding nonwoven fibers can be felt at the surface, because all nonwoven fibers or almost all nonwoven fibers are interconnected in one plane. A fluffy surface has many protruding nonwoven fibers, which are clearly perceptible. The fluffiness depends, among other things, on the degree of compression, the temperature of the respective side and the heat-up time of the blank during manufacture and the degree of needling of the employed nonwoven material. The different degree of compression leads to different pile heights of the respective sections. In contrast to hard surfaces, fluffy surfaces have dense, loose, airy nonwoven fibers with visible air inclusions.

In this embodiment, the haptics of the respective sections on the visible side of the interior trim component are therefore specifically altered not only by changing the hardness, but also by changing the surface roughness, so that both the resulting haptic perception and the visual impression for the vehicle occupant can be designed to be particularly prominent and pleasant.

In another embodiment, the nonwoven material can be a needled nonwoven material. It has been found that needled nonwoven material is able to produce very easily and cost-effectively the desired surface properties, in particular with respect to hardness and surface roughness. As an alternative to a needled nonwoven material, a water jet nonwoven material can be used.

Another embodiment is characterized in that the needled nonwoven material comprises thermoplastic fibers with different melting and/or softening temperatures. In this embodiment, the interior trim component can be provided with different densities and consequently with different hardness values depending on the melting and/or softening temperatures used. Since the melting and/or softening temperatures used in the manufacture of the present interior trim component can be set and changed comparatively easily, the manufacturing process can be kept simple. Thermoplastic fibers have proven to be particularly suitable for this purpose. Typical melting temperatures are around 250° C., while the softening temperatures are lower. Depending on the type of fibers used, the softening temperatures can be between 60 and 110° C., but also around 200° C. When the softening temperature is reached, the fibers in question are partially melted, so that both firm and softened regions are present.

According to another embodiment, the thermoplastic fibers consist of polyester, in particular of polyethylene terephthalate or polybutylene terephthalate. The use of such polyester fibers has proven to be particularly suitable.

Another embodiment is characterized in that the nonwoven material includes bi-component fibers. Bi-component fibers are co-extruded fibers having a core and a cladding surrounding the core. The core can be made of a material with a different melting or softening temperature than the sheathing. When using bi-component fibers, the three-dimensional shape of the interior trim component is particularly well preserved after the deformation and solidification.

In another embodiment, the proportion by weight of thermoplastic fibers to bi-component fibers can be between 70:30 and 30:70. It has been shown that good shape retention can be achieved when both thermoplastic fibers and bi-component fibers are intermixed. The stated weight-based ratio has proven to be particularly suitable.

One embodiment of the invention relates to a device for producing an interior trim component according to one of the previous embodiments, including
    a calibration tool for calibrating and preforming a blank, so that the calibrated and preformed blank has a three-dimensional shape, and
    a pressing tool for molding an interior trim component according to one of the preceding embodiments from the calibrated and preformed blank.

The technical effects and advantages that can be achieved with the proposed device correspond to those previously discussed for the present interior trim component. In summary, it should be pointed out that the present interior trim component can be produced in a simple and inexpensive manner with this device. At this point, it should be noted that the calibration tool used for calibration heats the blank to its deformation temperature and pre-deforms the blank during calibration so that the blank has a three-dimensional shape after calibration, which roughly corresponds to the final shape of the interior trim component. Again, the three-dimensional shape is defined so that the interior trim component has curved sections and/or flat sections, with the flat sections and/or the curved sections having different wall thicknesses.

In previously known calibrations, the blank, which has in the initial state a two-dimensional flat shape, is not preformed into a three-dimensional shape commensurate with the above definition, but instead retains its essentially two-dimensional shape. The calibration is especially intended to bring the blanks to a uniform, reproducible and predetermined thickness, to heat the blanks to their melting or softening temperatures, and to remove air from the blank.

The three-dimensional shape of the blank calibrated with the calibrating tool does not yet correspond to the final shape of the interior trim component, but comes relatively close to the final shape. The extent of the reforming carried out in the pressing tool is significantly reduced with the proposed device compared to devices known from the prior art. As a result, the blank can be much more precisely placed and positioned in the pressing tool, so that the interior trim component manufactured with the proposed device can be manufactured with significantly higher precision and reproducibility. As mentioned at the beginning, the proposed interior trim component has at least two sections with different surface properties. Because the preformed blank can be much more precisely placed and positioned in the pressing tool than previously, the various sections can be manufactured with greater accuracy. In particular, the transitions between the sections are clearly defined, so that the process reliability can be increased significantly with the proposed device compared to with a device in which the calibrated blank has a two-dimensional shape.

In another embodiment, the calibration tool may have an upper tool with an upper tool surface and a lower tool with a lower tool surface which can be moved relative to one another, wherein the upper tool and/or the lower tool have at least two temperature zones which can be operated at different temperatures. The upper tool surface and the lower tool surface are those surfaces of the calibration tool that come into contact with the blank during calibration.

By using different temperatures within the calibration tool, the finished interior trim component can be provided with the above-described various surface properties, in particular with different hardness values.

According to another embodiment, the temperature zones may be separated from each other by an insulating layer. In this embodiment, the temperature zones can be clearly separated from one another thermally, so that transition regions between the temperature zones, where undefined temperatures may occur, can be kept small or even avoided entirely. The different sections and their surface properties of the proposed interior trim component are clearly separated from one another. Transitional regions with undefined surface properties can be minimized.

In accordance with another embodiment, the insulating layer forms part of the upper tool surface and/or the lower tool surface. The temperature zones can continue to the upper tool surface or to the lower tool surface, where the blank comes into contact with the calibration tool. As a result, the clear thermal separation of the temperature zones is maintained up to the blank. The various sections and their surface properties of the proposed interior trim component are particularly clearly separated from one another. Transition regions with undefined surface properties can be minimized or completely eliminated.

In another embodiment, a non-stick coating may be applied on the upper tool surface and/or on the lower tool surface. The non-stick coating can, for example, include or consist of PTFE (polytetrafluoroethylene) or silicone. The non-stick coating facilitates in particular the processing and in particular demolding of the nonwoven material, which includes thermoplastic fibers. Depending on the employed nonwoven material, adequate demolding can also be achieved without a non-stick coating.

One embodiment of the invention relates to a method for producing an interior trim component according to one of the previously discussed embodiments using a device according to one of the previously discussed embodiments, with the following steps:

calibrating and preforming a blank with a calibration tool such that the calibrated and preformed blank has a three-dimensional shape, removing the calibrated and preformed blank from the calibration tool and transferring the calibrated and preformed blank into the pressing tool, and forming an interior trim component according to one of the previously discussed embodiments from the calibrated and preformed blank using a pressing tool.

The technical effects and advantages that can be achieved with the proposed method correspond to those previously discussed for the present interior trim component. In summary, the following should be noted: The three-dimensional shape of the blank calibrated according to the proposal method does not yet correspond to the final shape of the interior trim component, but comes relatively close to the final shape. The extent of reforming performed in the pressing tool is significantly reduced with the proposed method. As a result, the blank can be much more precisely placed and positioned in the pressing tool, so that the interior trim component manufactured according to the proposed method can be manufactured with significantly higher precision. Because the preformed blank can be much more precisely placed and positioned in the pressing tool, the various sections can also be manufactured more precisely. In particular, the transitions between the sections are clearly defined, so that the process reliability can be significantly increased with the proposed method than with a method in which the calibrated blank has a two-dimensional shape.

In another embodiment, the upper tool and/or the lower tool of the calibration tool can have at least two temperature zones and the method can include the step of operating the temperature zones at different temperatures. By using different temperatures within the calibration tool, the finished interior trim component can be comparatively easily provided with the different surface properties described at the onset.

According to another embodiment of the method, the step of preforming the blank is carried out with calibration tool in such a way that the calibrated and preformed blank has a three-dimensional shape. In principle, the various surface properties described above can also be achieved with a blank that has a two-dimensional shape after calibration and before the interior trim component is formed, for example by performing the calibration on the same side of the blank at different temperatures. In this case, however, it is very difficult to insert the calibrated, two-dimensional blank into the pressing tool with the necessary precision. However, if the blank is calibrated so that it is preformed into a three-dimensional shape, with the blank then having a shape that roughly corresponds to that of the finished interior trim component, the insertion into the pressing tool is significantly easier and the process reliability is increased.

Furthermore, the proposed method includes the step of injection-molding or back-injection of functional elements. Functional elements can be used, for example, to simplify the positioning of the interior trim component in relation to adjacent components.

A further implementation of the invention relates to a door side trim of a motor vehicle, which includes an interior trim component according to one of the previously described embodiments. The technical effects and advantages that can be achieved with the proposed method correspond to those that have been discussed above for the present interior trim component.

BRIEF DESCRIPTION OF THE DRAWINGS

Exemplary embodiments of the invention will now be explained in more detail with reference to the appended drawings which show in FIG. 1A: a perspective view of a driver's door of a motor vehicle which is clad with an interior trim component according to the invention.

DETAILED DESCRIPTION OF PREFERRED EMBODIMENTS

Figure 1A:
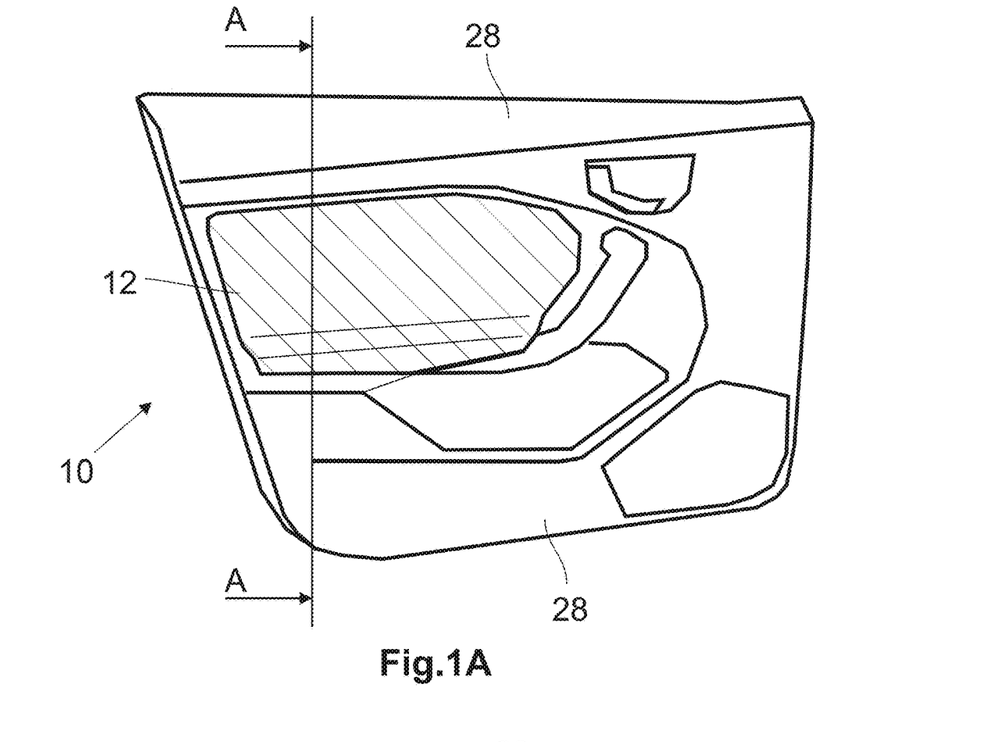

FIG. 1A shows a schematic perspective view of a door side panel 10 of a vehicle door of an unillustrated motor vehicle with an interior trim component 12 according to the present invention.

Figure 1B:
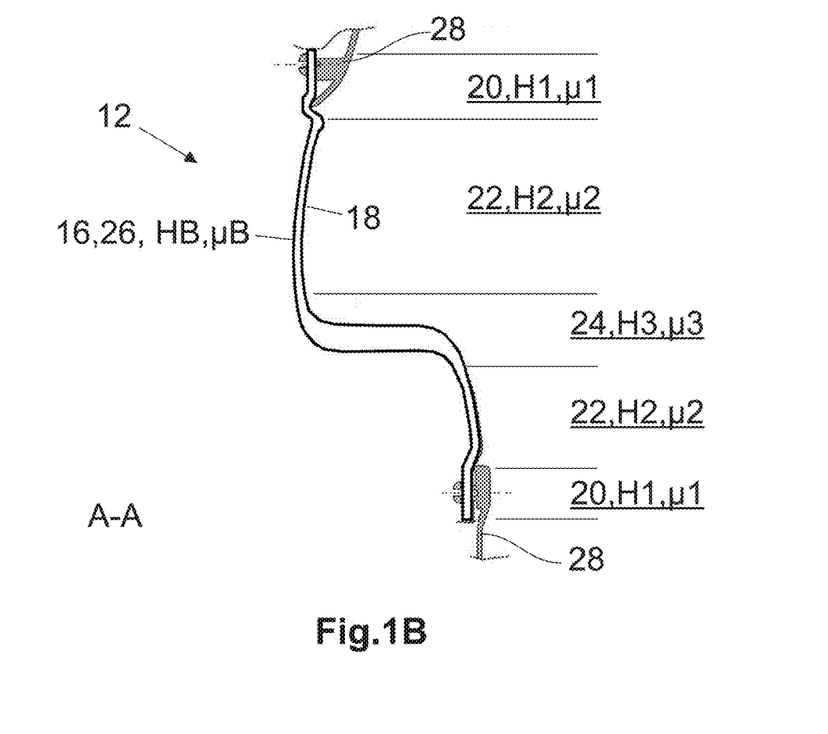
FIG. 1B: a sectional view through the interior trim component along the section plane A-A defined in FIG. 1A, FIG. 2A: an uncalibrated blank.

FIG. 1B shows the interior trim component 12 according to the invention shown in FIG. 1A in a sectional view along a section plane A-A defined in FIG. 1A. The interior trim component 12 has a first surface 16 and a second surface 18, with the second surface 18 forming in the installed state the visible side that can be seen by a vehicle occupant and is partially visible in FIG. 1A. As is evident from FIG. 1B, the second surface 18 may be formed of a total of two first sections 20, two second sections 22 and third section 24, so that the second surface 18 can be divided into, for example, into a total of five sections 20, 22, 24. However, the second surface 18 may also be formed by only one first section 20 (not shown). The two first sections 20 have a first section hardness H1, the two second sections 22 have a second section hardness H2 and the third section 24 has a third section hardness H3, which are each different from one another. For example, the magnitude of the first section hardness H1 is the greatest of all section hardness values H1, H2, H3 of the second surface 18, with the second section hardness H2 being only insignificantly less than the first section hardness H1. However, the third section hardness H3 is significantly lower than the first and the second section hardness H1, H2. Other magnitudes of section hardness values H1, H2 and H3 are also conceivable.

The first surface 16 is formed by a single region 26 with a constant region hardness HB. The region hardness HB has, for example, an equal or similar magnitude as the first section hardness H1. As can be seen from FIG. 1B, the interior trim component 12 is fastened in the two first sections 20 to an adjacent component 28 of the door side trim 10. The adjacent component 28 can also be part of the door side trim 10, for example a base support or the front wall of a map pocket, while the interior trim component 12 forms a door insert with an integrated armrest. Because of the first hardness H1 of the interior trim component 12 in the two first sections 20, the interior trim component 12 can be reliably and precisely connected to the adjacent components 28.

In addition to the section hardness values H1, H2, H3, the sections 20, 22, 24 also differ in their surface roughness. The first sections 20 have a first surface roughness $\mu 1$, the second sections 22 have a second surface roughness $\mu 2$, and the third section 24 has a third surface roughness $\mu 3$. Whereas, for example, the second surface 18 is relatively smooth in the first two portions 20 and thus has a low first surface roughness $\mu 1$, the second sections 22 and third sections 24 have significantly higher second and third surface roughness values $\mu 2$, $\mu 3$. The second and the third surface roughness values $\mu 2$, $\mu 3$ are designed such that the second surface 18 is perceived by the vehicle occupant as fluffy in the two second sections 22 and in the third section 24. The region 26 of the first surface 16 has the region surface roughness $\mu B$. The first surface 16 is markedly smoother than the second surface 18, so that the region surface roughness $\mu B$ is significantly smaller than the smallest surface roughness of the second surface 18, i.e. the first surface roughness $\mu 1$.

Figure 2A:
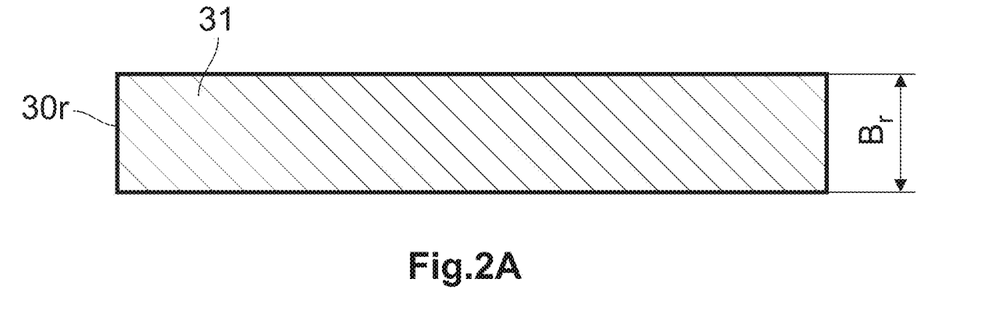
Figure 2B:
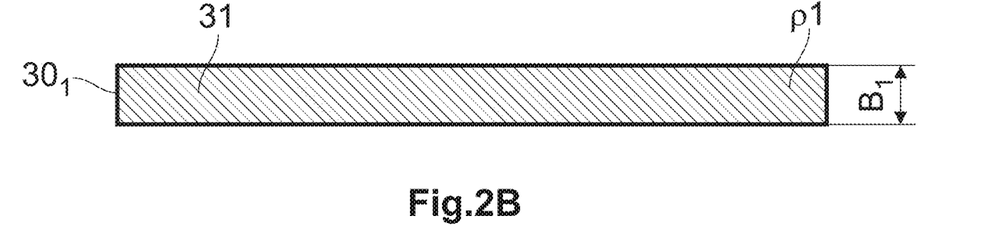
FIGS. 2B to 2D: schematic diagrams of blanks calibrated and preformed in different ways.
Figure 2C:
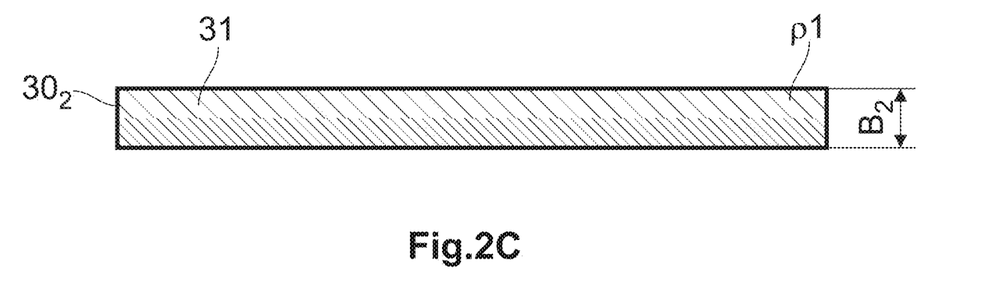
Figure 2D:
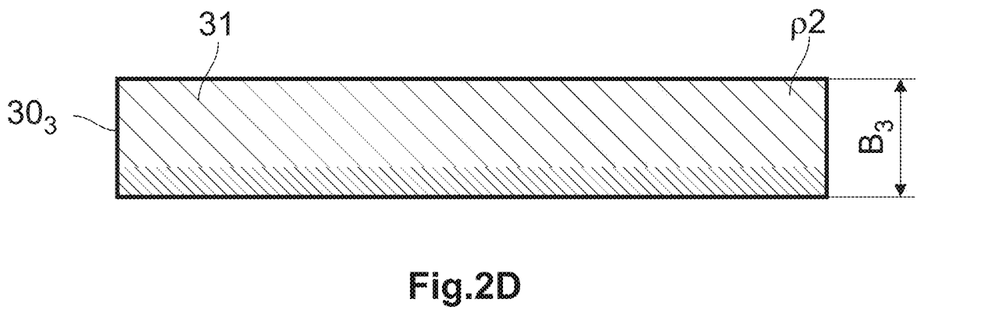

FIG. 2A shows a schematic diagram of a non-calibrated blank 30r, from which a proposed interior trim component 12 can be produced. FIGS. 2B to 2D each show different embodiments of a calibrated blank $30_1$ to $30_3$ separately and in a schematic diagram. The blank 30 consists of a nonwoven material 31, in this case a needled nonwoven material 31, which may contain thermoplastic fibers made, for example, of polyester. The employed polyester may be, for example, polyethylene terephthalate (PET) or polybutylene terephthalate (PBT). In addition, the nonwoven material 31 can also include, in particular, co-extruded bi-component fibers, which can have a specific, in particular weight-related, ratio to the thermoplastic fibers. The ratio of thermoplastic fibers to the bi-component fibers can be, for example, between 70:30 and 30:70. The desired permanent deformation can no longer be achieved with a ratio of 90:10.

The blank 30r shown in FIG. 2A is first calibrated in a calibration tool (not shown here), whereby the blank 30r is compressed. As can be seen from FIGS. 2B to 2D, the blank 30 can be compressed to different degrees. The blank $30_1$ shown In FIG. 2B has been compressed relatively strongly to a first density $\rho 1$, with the same temperature used in the calibration on both sides of the blank 30. The temperature used here is relatively high and is, for example, between 140 and 200° C. As a result, the blank $30_1$ has a hard surface and a smooth surface on both the top side and the bottom side.

The blank $30_2$ shown in FIG. 2C has been compressed to the same extent as the blank $30_1$ shown in FIG. 2B, so that the blank $30_2$ shown in FIG. 2C also has the first density $\rho 1$. However, a higher temperature was used on the bottom side than on the top side. While the bottom side is smooth, the top side is hard but fluffy.

The blank $30_3$ shown in FIG. 2D was compressed to a lesser extent than the blanks shown in FIGS. 2B and 2C. The blank $30_3$ shown in FIG. 2D has therefore a second density $\rho 2$ that is smaller than the first density $\rho 1$. As with the blank $30_2$ shown in FIG. 2C, the temperature during calibration is higher on the bottom side than on the top side. Again, the bottom side is hard and smooth, while the top side is soft and fluffy.

The different densities $\rho$ can be produced by providing the non-calibrated and non-preformed blank 30r with different wall thicknesses $B_r$.

Figure 3:
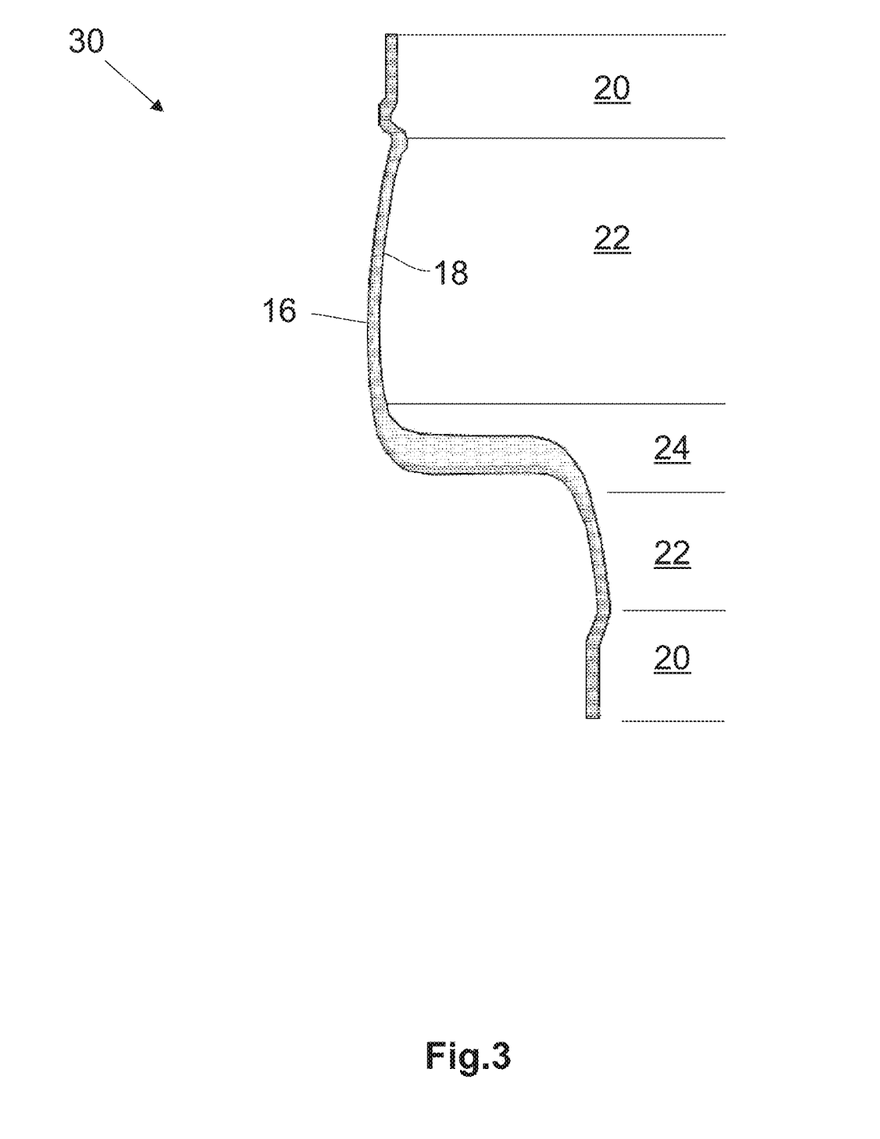
FIG. 3: a sectional view through a calibrated and preformed 3-D blank.

FIG. 3 shows a calibrated 3D-blank 30 which has two first sections 20, two second sections 22, and one third section 24. As can be clearly seen, both the first surface 16 and the second surface 18 are curved. However, the first surface 16 may also be flat and the second surface 18 may have different heights (not shown). In that case, the blank 30 is also referred to as 2.5D-blank.

The two first sections 20 have the same properties as the blank 30 shown in FIG. 2B. The two second sections 22 have the same properties as the blank $30_2$ shown in FIG. 2C. The third section 24 has the same properties as the blank $30_3$ shown in FIG. 2D. The blank 30 calibrated in this manner is placed in a forming tool, which is not separately shown here.

Figure 4A:
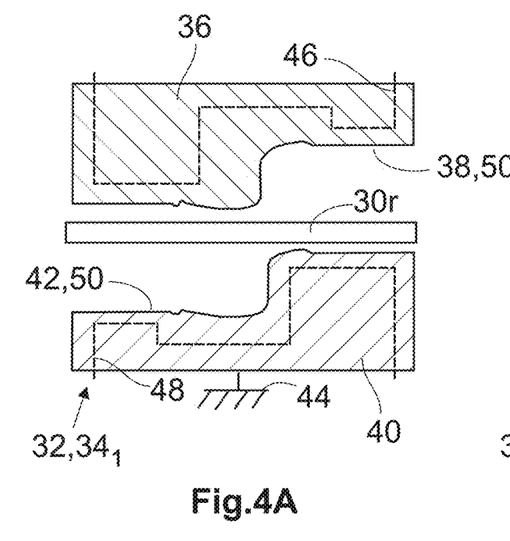
FIGS. 4A to 4D: a schematic diagram of a three-dimensional calibration process according to the invention of a blank with a calibration tool according to a first exemplary embodiment.
Figure 4B:
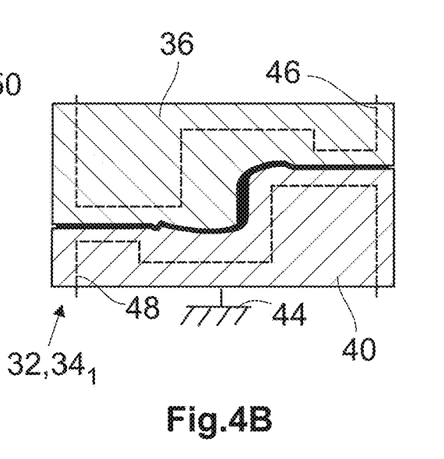
Figure 4C:
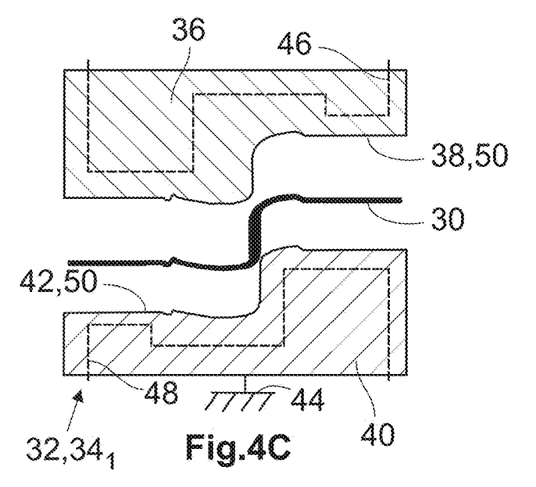
Figure 4D:
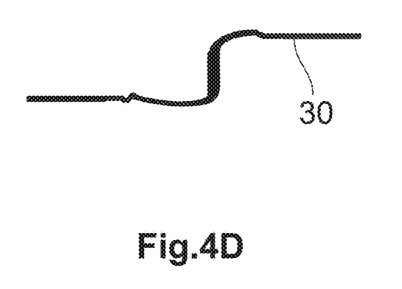

FIGS. 4A to 4D and 6A to 6F show a device 32 according to the invention and a method according to the invention for producing an interior trim component 12 as shown in FIGS. 1A and 1B. The device 32 according to the invention includes a calibration tool $34_1$, a first exemplary embodiment of which is shown in FIGS. 4A to 4C. The calibration tool $34_1$ has an upper tool 36 with an upper tool surface 38 and a lower tool 40 with a lower tool surface 42. The upper tool 36 and the lower tool 40 can be moved relative to one another with an unillustrated movement device. In the illustrated embodiment of the calibration tool $34_1$, the lower tool 40 is affixed to a floor 44, for example of a factory building, and only the upper tool 36 is movable relative to the lower tool 40. The upper tool 36 is provided with an upper tool heating device 46 and the lower tool 40 is provided with a lower tool heating device 48, so that the blank 30 can be heated to a specific temperature during calibration. The temperature on the upper tool surface 38 can differ from the temperature on the lower tool surface 42. This makes it possible to provide the first surface 16 of the interior trim component 12 with a different surface property than the second surface 18.

FIG. 4A shows the calibration tool 34₁ in an open state in which the upper tool 36 and the lower tool 40 are arranged at a maximum distance from one another. In the open state, a mat-shaped blank 30r can be inserted into the calibration tool 34₁. The blank 30r has an essentially flat, two-dimensional shape. The calibration tool 34₁ is then closed by moving the upper tool 36 is moved towards the lower tool 40. The blank 30 is thereby calibrated and preformed into a three-dimensional shape. The calibration tool 34₁ is then opened allowing removal of the calibrated, preformed blank 30. To facilitate removal from the mold, the upper tool surface 38 and the lower tool surface 42 are provided with a non-stick coating 50, which however is not absolutely necessary.

Figure 5:
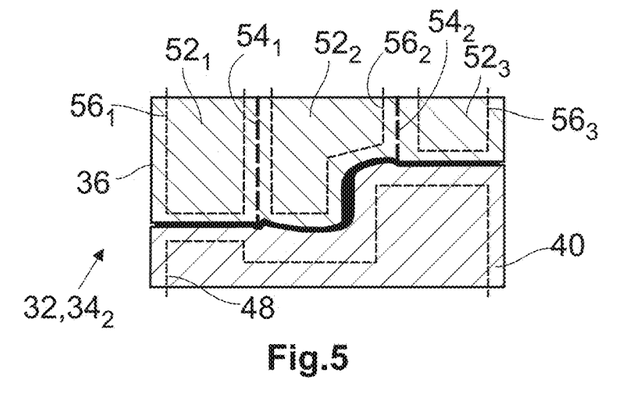
FIG. 5: a schematic sectional view through a calibration tool according to a second exemplary embodiment.

FIG. 5 shows in a separate diagram a second exemplary embodiment of the calibration tool 34₂ in the closed state. The basic structure of the calibration tool 34₂ according to the second embodiment largely corresponds to the configuration of the calibration tool 34₁ according to the first embodiment, except that the upper tool 36 has a total of three temperature zones 52₁ to 52₃. The three temperature zones 52₁, 52₂, 52₃ are each separated by an insulating layer 54₁, 54₂, which extends to the upper tool surface 38. The three temperature zones 52₁, 52₂, 52₃ of the upper tool 36 each have their own heating device 56₁, 56₂, 56₃, enabling the temperature zones 52₁, 52₂, 52₃ to be heated to different temperatures. As mentioned before, the surface properties can be influenced by the temperature used during calibration. The blank 30 produced and preformed with the second exemplary embodiment of the calibration tool 34₂ therefore has a second surface 18, which consists of a total of three sections 20, 22, 24 with different surface properties, in particular formed with different hardness values H1, H2, H3 and different surface roughness values μ1, μ2, μ3.

Figure 6A:
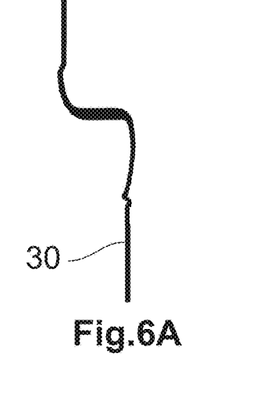
FIGS. 6A to 6F: a schematic diagram of a manufacturing process according to the invention with a pressing tool using a blank calibrated according to FIGS. 4A to 4D, and FIGS. 7A and 7B: a schematic sectional view, not to scale, of the first and third sections shown in FIGS. 3A and 3B.
Figure 6B:
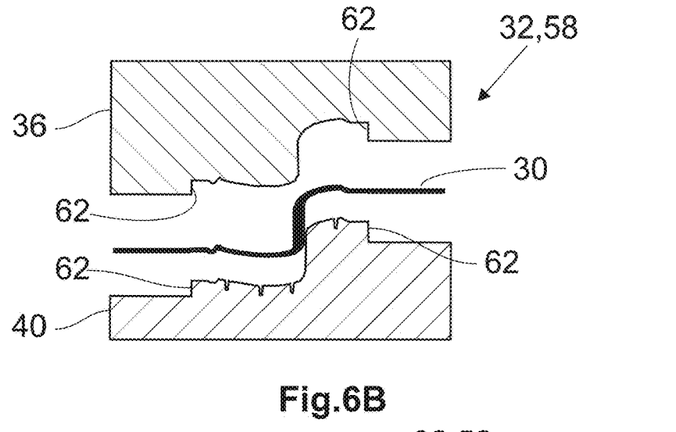

FIGS. 6B to 6E show various schematic diagrams of an exemplary embodiment of a pressing tool 58 belonging to the device 32 in different operating states. FIG. 6A shows the blank 30 previously shown in FIG. 4D which was preformed into a three-dimensional shape and calibrated, and which is, as shown in FIG. 6B, inserted into the opened pressing tool 58. The pressing tool 58 is then closed (FIG. 6C) by moving the upper tool 36 toward the lower tool 40. In the closed state, the blank 30 is shaped into the final shape, thereby producing the proposed interior trim component 12. The surface properties of the first surface 16 and of the second surface 18 are predetermined during calibration in the first pressing tool 34 and remain largely unchanged during processing in the pressing tool 58.

Figure 6C:
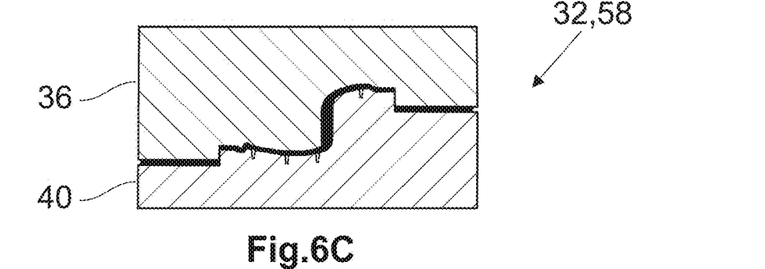

The pressing tool 58 has cutting edges 62 which cut the blank 30 to the desired size when the pressing tool 58 is closed.

Figure 6D:
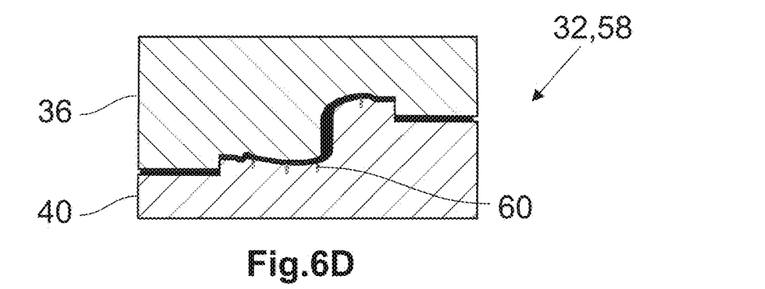
Figure 6E:
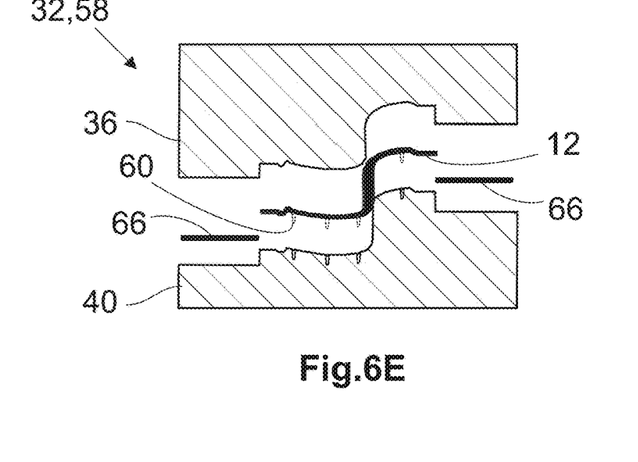
Figure 6F:
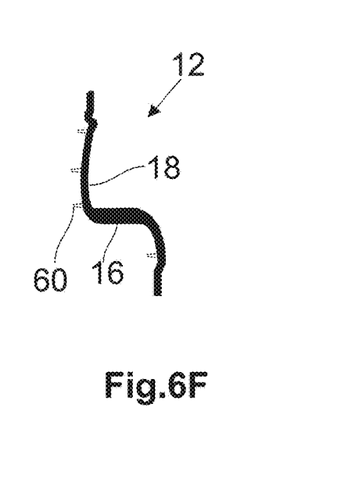

The interior trim component 12 can have a number of functional elements 60, which can be used, for example, to simplify fastening and/or positioning of the interior trim component 12 in the motor vehicle or relative to adjacent components such as component 28. These functional elements 60 are injection-molded in the pressing tool 58, as shown in FIG. 6D. After the functional elements 60 have been injection-molded, the pressing tool 58 is opened (FIG. 6E), allowing the finished interior trim component 12 to be removed, as shown in FIG. 6F. Due to the cutting of the interior trim component 12 to the desired size, residual pieces 66 are produced, which are disposed of or recycled. The manufacturing process of the interior trim component 12 is now complete.

The interior trim component 12 shown in FIG. 6F is constructed essentially exactly like the interior trim component 12 shown in FIG. 3, but has somewhat different dimensions and includes the aforementioned functional elements 60. In particular, the interior trim component 12 shown in FIG. 6F has the two first sections 22, the two second sections 24 and the third section 24 with the corresponding section hardness values H1, H2, H3 and the surface roughness values μ1, μ2, μ3, which are not shown in FIG. 6F to simplify the drawing.

As is evident from the above discussions, the calibration tool 34 and the pressing tool 58 have similar structures. However, the calibration tool 34 cannot be used to injection-mold functional elements 60. The calibration tool 34 also has no cutting edges 62. As mentioned, the blank 30 is preformed in the calibration tool 34 and hence has approximately the shape of the finished interior trim component 12. The profiles of the upper tool surface 38 and the lower tool surface 42 can therefore be significantly less precise than those of the pressing tool 58. The temperature control of the pressing tool 58 is carried out at significantly lower temperatures than in the calibration tool 34, where the process is therefore more accurately referred as heating instead of temperature control. Depending on the temperature zones 52, the calibration tool 34 is heated to temperatures between 50 and 230° C.

Figure 7A:
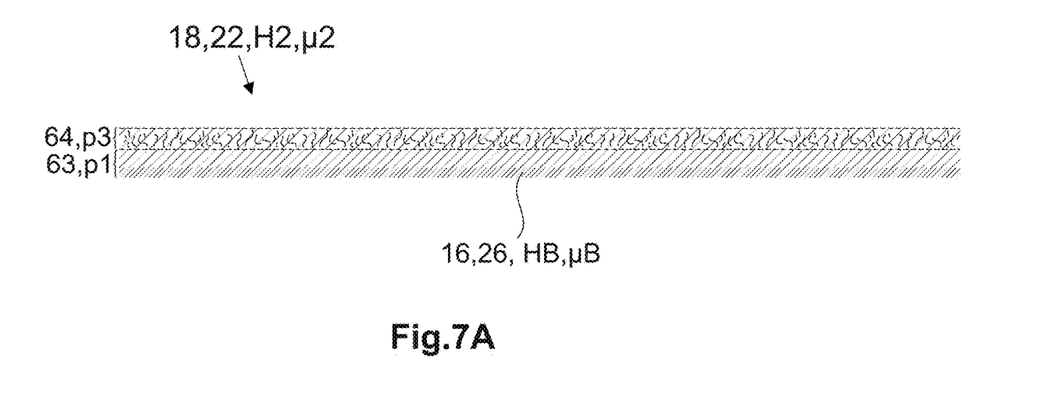
Figure 7B:
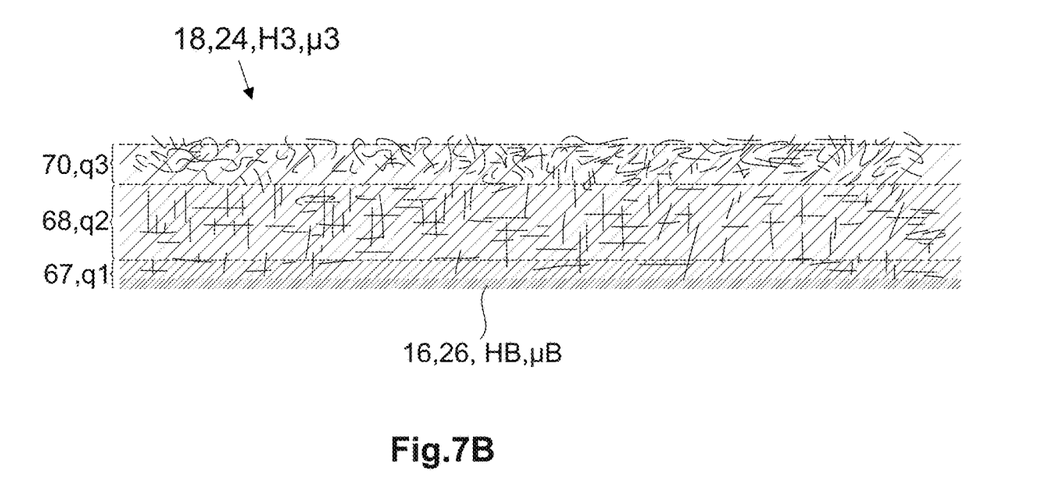

FIG. 7A shows the second section 22 shown in FIG. 1B and FIG. 7B shows the third section 24 shown in FIG. 1B in form of an enlarged schematic sectional view. As already mentioned, the second section 22 shown in FIG. 7A has the second section hardness H2 and the second surface roughness μ2, whereas the third section 24 shown in FIG. 7B has the third section hardness H3 and the third surface roughness μ3. The second section 22 and the third section 24 form part of the second surface 18, which is also the visible side. The first surface 16 includes exclusively the region 26, which has the constant region hardness HB and the constant region surface roughness μB. Hardly any loose nonwoven fibers protrude from the interior trim component 12 in the smooth and hard region 26.

The first section 20 (not shown in FIGS. 7A and 7B) has the same structure as the first surface 16, so that the first hardness H1 is equal to the region hardness HB and the first surface roughness μ1 is equal to the region surface roughness μB. This does not rule out that the first section can also be structured differently. However, this structure is beneficial because the interior trim component 12 is fastened in the first section 20 to an adjacent component 28 (see FIG. 1B).

To be able to provide the higher second section hardness H2 compared to the third section hardness H3 and lower second surface roughness μ2 compared to the third surface roughness μ3, the structure of the second section 22 differs from the third section 24 essentially as follows: second section 22 has a lower layer 63 and the third section 24 has a lower layer 67. The two lower layers 63 and 67 are produced by direct exposure to a high temperature when the interior trim component 12 is formed from the calibrated and preformed blank 30. However, the lower layer thickness p1 of the lower layer 63 of the second section 22 is smaller than the lower layer thickness q1 of the lower layer 67 of the third section 24. The different lower layer thicknesses p1 and q1 are achieved as a result of different compression of the calibrated and preformed blank 30. The compression of the calibrated and preformed blank 30 is higher in the second section 22 than in the third section 24.

Furthermore, the second section 22 has an upper layer 64 and the third section 24 has an upper layer 70. The upper layer 64 has an upper layer thickness p3 and the upper layer 70 has an upper layer thickness q3. The upper layer thicknesses p3 and q3 can also be referred to as pile height. Due to the aforementioned different compression of the calibrated and preformed blank 30, the upper layer thickness p3 is less than the upper layer thickness q3. Both upper layers 64 and 70 have many protruding loose nonwoven fibers, so that both the upper layer 64 and the upper layer 70 are perceived as fluffy. However, because the upper layer thickness p3 is smaller than the upper layer thickness q3, the first hardness H1 is greater than the third hardness H3.

Also due to the different compression of the calibrated and preformed blank 30, an intermediate layer 68 with the intermediate layer thickness q2 is formed in the third section 24. Consequently, the total height of the trim component 12 in the second section 22, which is the sum of the lower layer thickness p1 and the upper layer thickness p3, is less than the total height in the third section 24, which is the sum of the lower layer thickness q1, the intermediate thickness layer q2 and the upper layer thickness q3.

The nonwoven fibers do not have any particular orientation, i.e. they are neither woven nor knitted and therefore have no stitches or closed loops. They can also be referred to as fiber pile. The nonwoven fibers can also be cut to provide a certain overall height and a certain hardness. As is customary with velour, fabrics whose loops are subsequently cut open can also be used.

What is claimed is:

1. An interior trim component with a three-dimensional shape for a motor vehicle, comprising,
a single nonwoven material including,
a first surface and a second surface,
a first section and a second section, each of which forming a part of the second surface,
wherein the first surface and the second surface are located opposite to each other, the second surface forms the visible side of the interior trim component, said first section has a first section hardness and the second section has a second section hardness, such that the first section hardness and the second section hardness are different,
wherein the interior trim component has one single region which forms the entire first surface, wherein the first section hardness is greater than the second section hardness, and the single region has a constant region hardness which is equal to the first section hardness.

2. The interior trim component according to claim 1, wherein the first section has a first density and the second section has a second density, said first density is between 0.6 g/cm$^3$ and 1 g/cm$^3$ and said second density is between 0.1 g/cm$^3$ and 0.6 g/cm$^3$.

3. The interior trim component according to claim 1, wherein the first section has a first surface roughness and the second section has a second surface roughness, said first surface roughness and said second surface roughness are different.

4. The interior trim component according to claim 1, wherein the nonwoven material is a needled nonwoven material.

5. The interior trim component according to claim 4, wherein the needled nonwoven material comprises thermoplastic fibers having different melting temperatures.

6. The interior trim component according to claim 5, wherein the thermoplastic fibers are composed of polyester.

7. The interior trim component according to claim 1, wherein the nonwoven material comprises bi-component fibers.

8. The interior trim component according to claim 7, wherein the proportion by weight of the thermoplastic fibers to the bi-component fibers is between 70:30 and 30:70.

9. An interior trim component with a three-dimensional shape for a motor vehicle, comprising,
a single nonwoven material including,
a first surface and a second surface,
a first section and a second section, each of which forming a part of the second surface,
wherein the first surface and the second surface are located opposite to each other, the second surface forming the visible side of the interior trim component, said first section has a first section hardness and said second section has a second section hardness, such that the first section hardness and the second section hardness are different,
wherein the interior trim component has one single region forming the entire first surface, wherein said first section hardness is greater than the second section hardness, and the single region has a constant region hardness equal to the first section hardness,
wherein said first section has a first density and the second section has a second density, said first density is between 0.6 g/cm$^3$ and 1 g/cm$^3$ and said second density is between 0.1 g/cm$^3$ and 0.6 g/cm$^3$.

10. An interior trim component with a three-dimensional shape for a motor vehicle, comprising,
a single nonwoven material including,
a first surface and a second surface,
a first section and a second section, each of which forming a part of the second surface,
wherein the first surface and the second surface are located opposite to each other, the second surface forming the visible side of the interior trim component,
said first section has a first section hardness and said second section has a second section hardness, such that the first section hardness and the second section hardness are different,
wherein the interior trim component has one single region which forms the entire first surface, wherein the first section hardness is greater than the second section hardness, and the region has a constant region hardness which is equal to the first section hardness,
said first section has a first section roughness and the second section has a second surface roughness, said first surface roughness and said second surface roughness are different.

* * * * *